Jan. 20, 1970     R. H. BENNETT, JR., ET AL     3,490,556
AIRCRAFT CABIN NOISE REDUCTION SYSTEM WITH
TUNED VIBRATION ABSORBERS
Filed Jan. 15, 1968     3 Sheets-Sheet 1
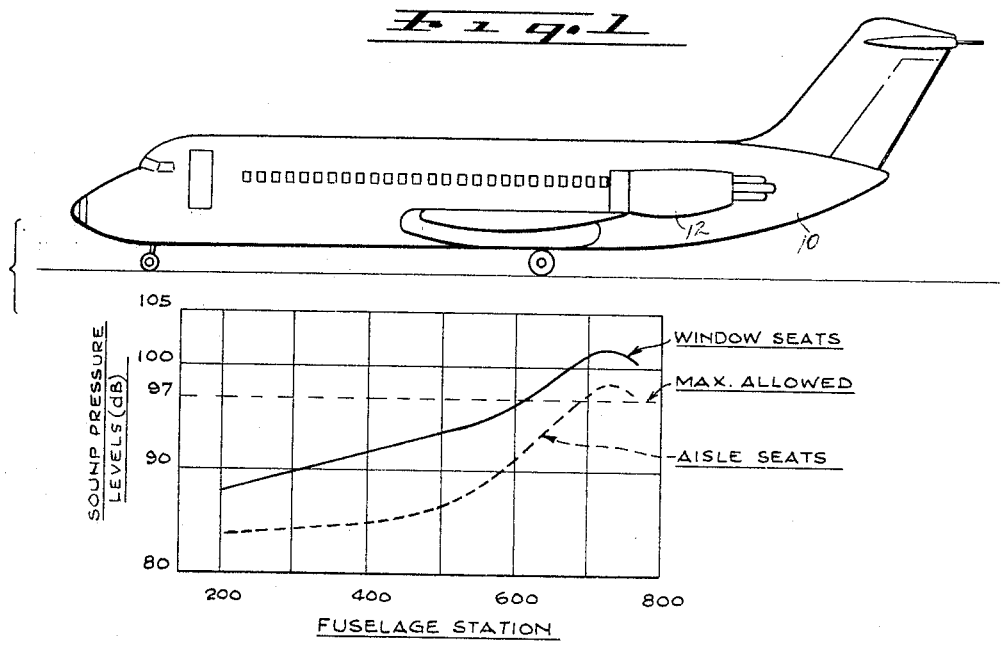
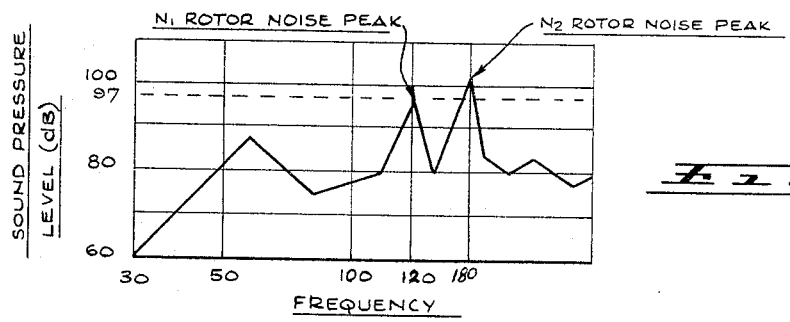
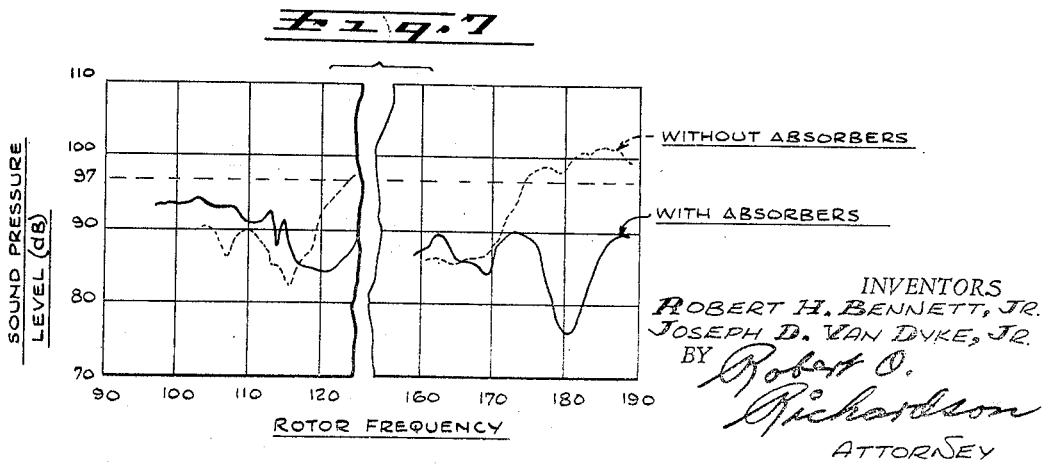
INVENTORS
ROBERT H. BENNETT, JR.
JOSEPH D. VAN DYKE, JR.
BY Robert O. Richardson
ATTORNEY

ROBERT H. BENNETT, JR.
JOSEPH D. VAN DYKE, JR
INVENTORS

BY Robert O. Richardson

ATTORNEY

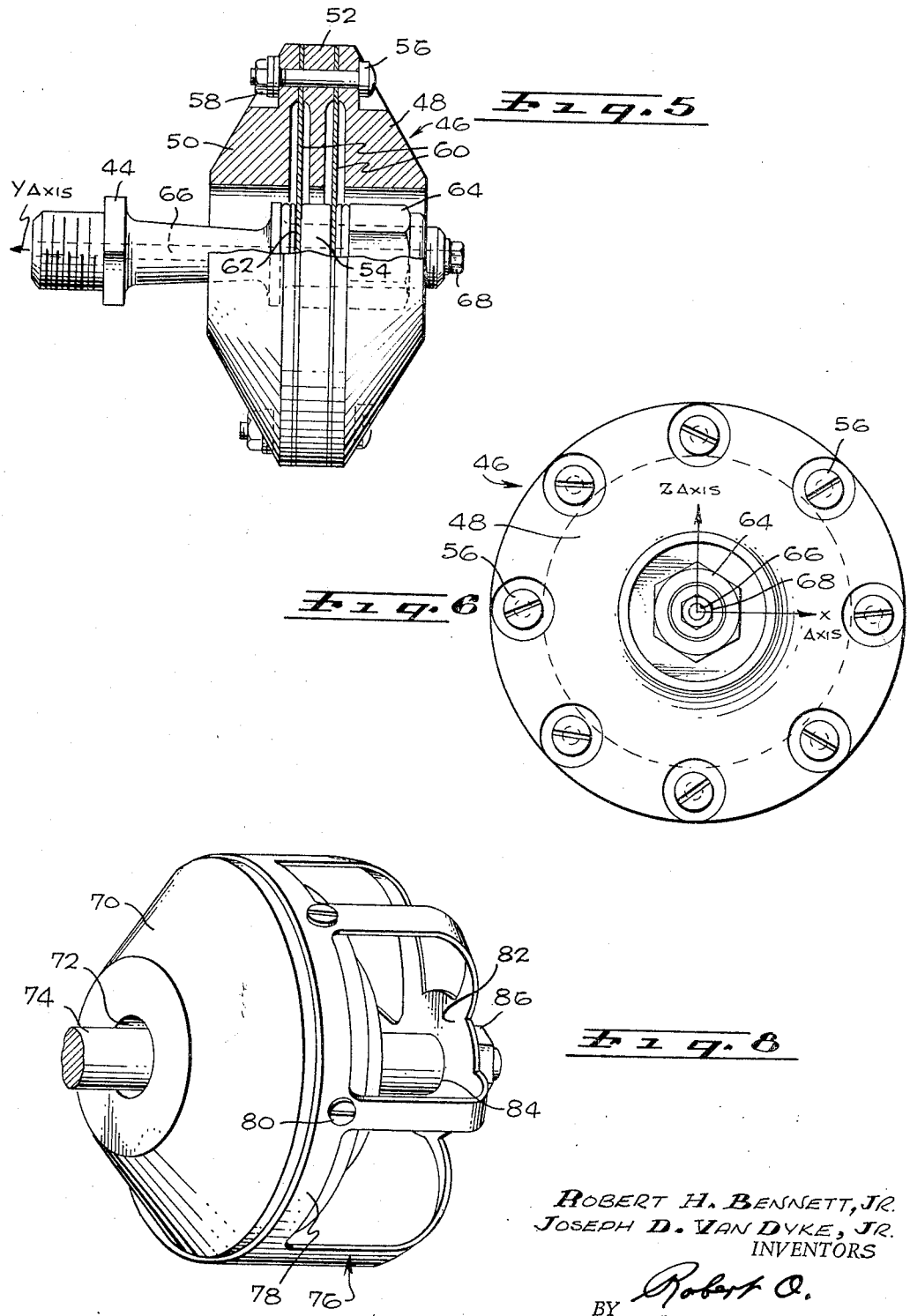

3,490,556
AIRCRAFT CABIN NOISE REDUCTION SYSTEM WITH TUNED VIBRATION ABSORBERS

Robert H. Bennett, Jr., and Joseph D. Van Dyke, Jr., Long Beach, Calif., assignors to McDonnell Douglas Corporation, a corporation of Maryland
Filed Jan. 15, 1968, Ser. No. 697,917
Int. Cl. G10k *11/04;* E04b *1/99*
U.S. Cl. 181—33                                      7 Claims

ABSTRACT OF THE DISCLOSURE

A vibration dampening device on the pylon of an aircraft between the engine and the fuselage to reduce noise in the aircraft due to imbalance in the engines. Noise reduction is accomplished by absorbing engine rotor frequencies at nominal cruise power settings, of which 120 c.p.s. for the $N_1$ rotor and 180 c.p.s. for the $N_2$ rotor is an example.

BACKGROUND OF THE INVENTION

One type of modern jet transport aircraft has engines mounted on the aft portion of the fuselage. Some of these aircraft were excessively noisy in the area of the rear windows, whereas the forward portion of the cabin was exceptionally quiet. The effect was similar to that experienced by passengers who sit near the plane of the propeller in tuboprop or reciprocating engine aircraft. A relationship was drawn betwen the relatively high noise levels at the aft end of the plane and the vibrations due to an imbalance in the engine. The noise generated in the cabin was due to fuselage shell vibration, causing the cabin structure to act much like a loudspeaker. The obvious attempt to reduce the engine-rotor vibration-induced cabin noise was by stiffening of the cabin structure. However, this is an undesirable approach as this adds weight to the airplane. Also this proved to be less effective than other solutions. The use of acoustic materials was tried but this did not reduce the noise level appreciably. Reducing the engine mount isolator stiffness as a means of suppressing engine vibration resulted in excesive static deflection due to engine thrust and weight. These deflections were critical because of associated systems at the interface between the engine and pylon.

Because engine rotor speeds during cruise conditions vary only within a narrow range, the vibration of the engine is within a relatively narrow frequency band. For practical purposes at cruise the rotor frequency varies from approximately 115 to 123 c.p.s. for the $N_1$ rotor and approximately 174 to 184 c.p.s. for the $N_2$ rotor. Thus the problem of noise suppression becomes one of vibration suppression within a limited frequency range. This problem is solved by this invention by the use of tuned vibration suppressors. From a practical point of view, the use of suppressors cause the least change in the airplane and can be retrofitted with a minimum of cost.

Vibration suppressors may be located on the pylon front spar just inside the fuselage shell where it is in the vicinity of the structural area radiating the noise. Vibration suppressors may be placed to the tip of the engine mount yoke where the highest amplitudes of vibration occur and where they will be in the direct path of vibration transmission to the fuselage. They also may be mounted at the intersection of the yoke and the pylon front spar because, while also in the path of vibration transmission, it is the most practicable location for physically mounting the absorber units.

SUMMARY OF THE INVENTION

The tuned vibration absorber system as a means of reducing cabin noise, in accordance with the present invention, consists of a resonant spring-mass vibration system, with the mass a concentrated weight near the unsupported end of a simple cantilevered beam which acts as the spring. This beam has a circular cross section tapered along its length. Tuning is accomplished by adjusting spring length. Four absorbers are mounted on each engine support yoke. One pair is tuned to have its fundamental resonance at $N_1$ rotor frequency, i.e. 120 c.p.s., and the other pair at $N_2$ rotor frequency, i.e. 180 c.p.s., during typical cruise flight conditions. This arrangement provides for maximum noise reduction.

Since the gyroscopic characteristics of the engine may cause vibrations to be transmitted to the fuselage both in a plane normal to the fuselage and also in a fore and aft direction, the sound suppressor comprising the present invention must be permitted to vibrate in three directions.

BRIEF DESCRIPTION OF DRAWINGS

FIG. 1 is a graphic illustration showing the sound pressure levels throughout the cabin of an airplane, FIG. 2 is a graphic illustration of the sound pressure level at various frequencies, FIG. 5 is a side view, partly in section, of one form of vibration suppressor, FIG. 6 is an end view of the suppressor, FIG. 7 is a graphic illustration comparing the results of using absorbers and without the use of absorbers, and FIG. 8 is a perspective view of an alternate form of vibration suppressor.

DESCRIPTION OF ILLUSTRATIVE EMBODIMENTS

In FIG. 1 there is shown the relationship of the various noise levels with various positions in the aircraft 10 shown above the graph. As can be seen the noise level at the front portion of the plane is relatively low and the noise level increases further to the rear. The noise level at the window seats is higher than at the aisle seats. A sound level of 97 db has been established as the maximum permissible level. Those seats at the rear have a noise level greater than that permitted and thus the graph illustrates the problem which resulted in the present invention. This problem is not limited only to airplanes with the engines 12 mounted on the fuselage. A similar problem exists with seats near the wing in some airplanes having engines mounted on the wings. The present solution applies to these also.

Typically, one type of jet engine used in transport aircraft have two separate rotors. The low-speed rotor ($N_1$) includes two fan stages, four compressor stages, and is driven by a three-stage turbine. The high-speed rotor ($N_2$) includes seven compressor stages and is driven by a single-stage turbine. In the cruise setting the rotor out-of-balance or vibration frequency is approximately 120 c.p.s. for the $N_1$ rotor and 180 c.p.s. for the $N_2$ rotor. In most cases it is the amplitude of the $N_2$ frequency that is excessive, as shown by the illustration in FIG. 2.

Figure 3:
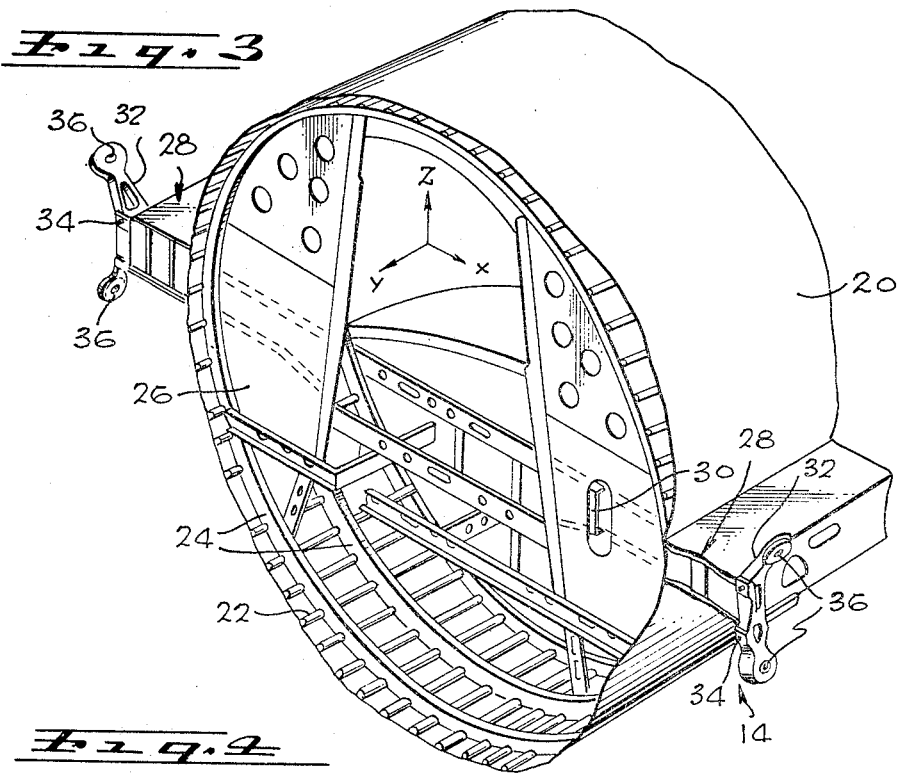
FIG. 3 is a sectional view of the cabin taken along the front spar of the engine pylons.

In FIG. 3 the fuselage 14 is shown broken away along the front spar of the engine mounting yoke. The aircraft X, Y and Z axes are shown. Outer skin surface 20 is held in place by reinforcing stringers 22 and circumferential ring frames 24. Bulkhead 26 reinforces the fuselage. Extending outwardly from the fuselage 14 on both sides are engine pylons 28 which are attached through struts 30 to maintain the framework and engine pylons in integral rigid relationship. Although the engines are not shown, the front part of the engine would be attached to the yokes 32 which are connected by yoke bolts 34 to the pylon 28. Another mounting on the pylon secures the rear part of the engine. Suitable apertures 36 in yoke 32 provide the appropriate mounting of the jet engine 12 shown in FIG. 1.

Figure 4:
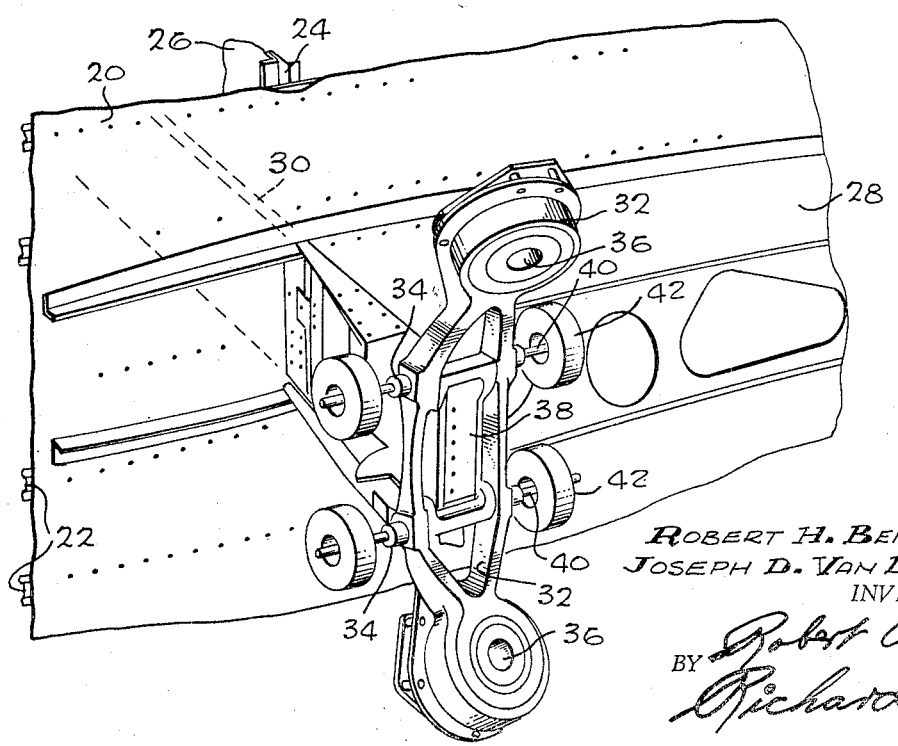
FIG. 4 is an enlarged perspective of a portion of FIG. 3 showing the sound suppressor system mounted on the yoke bolts.

FIG. 4 is an enlargement of the yoke area. Here there is shown a yoke 32 having mounting holes 36 for the mounting of a jet engine, not shown. This yoke is attached to the outwardly extending spar 38 which extends through the fuselage skin 20 to strut 30. Stringers 22 extend transversely along the fuselage and lend strength, rigidity and the desired configuration to the fuselage skin 20. Yoke 32, having engine mounting openings 36, is mounted to the transversely extending spar 38 and is connected thereto by yoke bolts 34. Extending outwardly from yoke bolts 34 are stems 40 and weights 42. The weights typicals are 8# to 10# in the preferred embodiment although they may be varied as needed. The engine, not shown, has two frequencies of vibration at nominal cruise power, one being 120 cycles per second resulting from the unbalance of inner rotor, and the other 180 cycles per second resulting from the outer spool. Springs 40 have a length and elasticity, and weights 42 have a mass so calculated that they provide an equal and opposite force to that of the engine unbalance. The spring, (or beam), length and flexibility, and the weight of the mass on the stem controls the static deflection from which the natural frequency can be calculated. It is desirable that the natural frequency of the suppression system be equal to the frequency to be dampened. For example, a 7.87 pound weight, selected by semi-empirical equations, on a beam of selected length and flexibility will produce a static deflection of .000675 inch. Using the relationship of $$FR = 3.14 \sqrt{\frac{1}{Dst}}$$

where FR=frequency and DST=static deflection, the vibration frequency of 120 c.p.s. is matched. Tuning may be done by changing the weights, or preferably by changing the length of beam 40. Two sets of weights 42 may be used to dampen the 120 cycles and the other two the 180 cycles. Thus, there is a much reduced net resulting force acting upon spar 38 and skin 20, and therefore skin 20 vibrates at a much reduced amplitude at the frequencies thus dampened. Because of the multiple modes of vibration that exist in the cabin structure, and because of the gyroscopic effect of the engine, the weights must be permitted to vibrate in all three axes. Such an embodiment is shown in FIGS. 5 and 6.

In FIG. 5 is shown a mounting 44 which mounts on the yoke bolt 34 in FIG. 4. This mounting includes a tapered beam with a collar and threaded shaft upon which weight assembly 46 is mounted. The weight assembly consists of weight sections 48, 50 and 52. Spacer 54 separates the disc springs 60. This assembly is held together by 8 bolts 56 and nuts 58. Tuning washer 62 is of a selected width to adjust the effective length of the beam 44 to the assembly 46, and thus permit its adjustment to the frequency it is to suppress. The thickness variation in the disc springs 60 permit tuning along the Y axis.

Through the center of beam 44 is another bolt 66 with nut 68 which hold the entire assembly together as a safety measure in the event of vibration failure of the assembly.

The disc springs 60 which are used at the end of steel beam mounting 44 to give the absorber system the third degree of freedom are preferably thin titanium diaphragms, titanium having lower stresses compared to its endurance limit than most other materials. Two diaphragms are used instead of one to keep the weight from going into a pure torsional mode about any line parallel to the X–Z plane of the aircraft. In this mode the absorbers would be ineffective. The second diaphragm gives torsional rigidity to the diaphragms in the mode just described and raises the frequency of this undesirable mode out of the range of frequencies that can be excited by engine vibrations.

Since the acceleration forces along the Y-axis of the aircraft are at 120 c.p.s. frequency only, the thickness of the diaphragms is such to operate at 120 c.p.s. whether installed on a beam designed to operate at 120 c.p.s. or 180 c.p.s.

Weight sections 48, 50 and 52 preferably are of a high density sintered tungsten material having a density of over twice that of steel.

In FIG. 7, a graph shows a typical comparison of the sound levels with rotor frequencies both with and without the use of the noise suppression weights just described. While the suppression at 120 c.p.s. is noticeable, that at 180 c.p.s. is quite significant, the embodiment tested being designed to suppress vibrations at this frequency.

An alternate embodiment is shown in the perspective view in FIG. 8. Here weight 70 has an aperture 72 therein of a size larger than that of yoke bolt 74. Weight 70 has a multiple spring retainer 76 attached to the periphery thereof by screws 80. The resilient legs of retainer 76 terminate in a collar 82 which has an aperture in the center. Bolt 74 has a shoulder 84 against which the collar 82 is held by nut 86. Weight 70 is thus mounted in a position to vibrate in any direction.

Having thus described illustrative embodiments of the present invention, it is to be understood that other forms will occur to those skilled in the art and it is to be understood that these deviations from, and variations of, the embodiments described are to be considered as part of this invention.

What is claimed is:

1. An aircraft cabin noise reduction system comprising:
    a plurality of tuned vibration absorbers,
    said absorbers being capable of reducing cabin noise level by absorbing engine induced vibrations in a plane normal to the cabin fuselage centerline and in a direction parallel to said centerline,
    said absorbers being mounted between the engine and cabin interior, and including weights mounted to vibrate in three axes,
    said weights being suspended on the unsupported ends of beams mounted on engine support structure.

2. An aircraft cabin noise reduction system as in claim 1,
    said weights being mounted on disc springs for motion along the Y-axis of the aircraft,
    said beams vibrating in the X–Z axis of said aircraft.

3. An aircraft cabin noise reduction system as in claim 1,
    a multiple spring retainer being mounted on engine support structure,
    said absorbers including a weight attached to said retainer for vibration in the X, Y, and Z axes of aircraft.

4. An aircraft cabin noise reduction system as in claim 2 wherein said disc springs are adapted to vibrate along the Y-axis on the order of approximately 120 cycles per second, wherein a portion of said beams are adapted to vibrate along the X–Z axis at a frequency of approximately 120 cycles per second and the rest of said beams at approximately 180 cycles per second.

5. An aircraft cabin noise reduction system as in claim 2 wherein said weights consist of three sections with a pair of disc springs positioned therebetween, said weights and springs being fastened together about their periphery, and said springs being positioned over the free end of said beam.

6. An aircraft cabin noise reduction system as in claim 5, and a tuning washer of selected thickness on said beam to adjust the effective length of said beam and thus adjust it to the desired frequency it is to suppress.

7. An aircraft cabin noise reduction system as in claim 5, and a safety bolt extending through said beam to hold the entire assembly together in the event of vibration failure of the assembly.

References Cited

UNITED STATES PATENTS

| | | | |
|---|---|---|---|
| 766,261 | 8/1904 | Jebsen | 248—358.1 |
| 2,038,603 | 4/1936 | Roche | 248—358.1 |
| 2,225,929 | 12/1940 | Sarazin | 244—75.6 |
| 2,344,735 | 3/1944 | Rockwell | 248—5 |
| 2,510,963 | 6/1950 | Dibblee | 248—358 |
| 2,901,239 | 8/1959 | Sethna. | |
| 2,902,273 | 9/1959 | Hohenner | 248—358 XR |
| 3,101,937 | 8/1963 | Stearns | 248—358 XR |
| 3,314,503 | 4/1967 | Neubert | 248—358 XR |

ROBERT J. WARD, JR., Primary Examiner

U.S. Cl. X.R.

244—54; 248—5, 15, 358